United States Patent
Carcagno et al.

(10) Patent No.: US 6,851,727 B2
(45) Date of Patent: Feb. 8, 2005

(54) THREADED PIPE JOINT

(75) Inventors: Gabriel E. Carcagno, Campana (AR);
Giuseppe Della Pina, Treviolo (IT);
Rita G. Toscano, Buenos Aires (AR);
Tommaso Coppola, Rome (IT)

(73) Assignee: Tenaris Connections B.V., Amsterdam (NL)

( * ) Notice: Subject to any disclaimer, the term of this patent is extended or adjusted under 35 U.S.C. 154(b) by 61 days.

(21) Appl. No.: 10/424,857

(22) Filed: Apr. 29, 2003

(65) Prior Publication Data
US 2004/0017079 A1 Jan. 29, 2004

(30) Foreign Application Priority Data
Apr. 30, 2002 (IT) ................................ RM2002A000234

(51) Int. Cl.[7] ................................................. F16L 35/00
(52) U.S. Cl. ....................................... 285/333; 285/390
(58) Field of Search ................................ 285/333, 334, 285/390, 355

(56) References Cited

U.S. PATENT DOCUMENTS

| | | | | |
|---|---|---|---|---|
| 3,856,337 A | * | 12/1974 | Ehm et al. ................... | 285/334 |
| 3,870,351 A | * | 3/1975 | Matsuki ...................... | 285/334 |
| 4,153,283 A | * | 5/1979 | Hellmund et al. ........... | 285/334 |
| 4,377,302 A | * | 3/1983 | Kohyama et al. ............ | 285/334 |
| 4,384,737 A | | 5/1983 | Reusser ...................... | 285/334 |
| 4,623,173 A | * | 11/1986 | Handa et al. ................ | 285/333 |
| 4,630,849 A | * | 12/1986 | Fukui et al. ................. | 285/55 |
| 4,736,967 A | * | 4/1988 | Mott et al. ................... | 285/94 |
| 4,830,411 A | * | 5/1989 | Tsuru et al. ................. | 285/334 |
| 4,871,194 A | * | 10/1989 | Kawashima et al. .......... | 285/55 |
| 5,064,224 A | | 11/1991 | Tai .............................. | 285/94 |
| 5,066,052 A | | 11/1991 | Read .......................... | 285/334 |
| 5,137,310 A | | 8/1992 | Noel et al. ................... | 285/333 |
| 5,649,725 A | | 7/1997 | Nagasaku et al. ........... | 285/334 |
| 6,305,723 B1 | | 10/2001 | Schutz et al. ................ | 285/333 |
| 6,409,175 B1 | | 6/2002 | Evans et al. ................. | 277/314 |
| 6,557,906 B1 | | 5/2003 | Carcagno .................... | 285/333 |
| 2002/0017788 A1 | | 2/2002 | Krug et al. .................. | 285/333 |
| 2002/0163192 A1 | | 11/2002 | Coulon et al. .............. | 285/331 |
| 2003/0067166 A1 | | 4/2003 | Sivley, IV ................... | 285/333 |
| 2003/0107217 A1 | | 6/2003 | Daigle et al. ................ | 285/355 |

FOREIGN PATENT DOCUMENTS

| | | | |
|---|---|---|---|
| CA | 2128060 | 1/1996 | ........... F16L/15/04 |
| EP | 0713952 | 5/1996 | ......... E21B/17/042 |
| EP | 0916883 | 5/1999 | ........... F16L/15/04 |
| EP | 1020674 | 7/2000 | ........... F16L/15/04 |
| EP | 1106778 | 6/2001 | ......... E21B/17/042 |
| EP | 1203909 | 5/2002 | ........... F16L/15/06 |
| WO | 01/94831 | 12/2001 | ........... F16L/15/06 |

* cited by examiner

Primary Examiner—Eric K. Nicholson
(74) Attorney, Agent, or Firm—Fitzpatrick, Cella, Harper & Scinto

(57) ABSTRACT

Threaded joint for pipes consisting of a male member (1) and a female member (2), which are provided on the outer and inner surfaces respectively with two threading portions presenting a lead-in flank β such that $10° \leq \beta \leq 25°$, an abutment surface (9) being present at the end of said male member for abutment to a corresponding annular abutment surface (10) of the female member. The lead-in flanks of the male (1) and the female (2) members, upon make-up and with unloaded joint leave a gap (in the direction parallel to the axis (21) of the joint) varying from 0.01 to 0.12 mm. The internal and external diameters D3 and D4 (of the pipe portion not involved in the coupling with the female member) of said male member, the inner and outer diameters D1 and D2 of the abutment surface of the female member are linked by the relationship: $(D2^2-D1^2)/(D4^2-D3^2) \geq 0.5$.

20 Claims, 1 Drawing Sheet

THREADED PIPE JOINT

FIELD OF THE INVENTION

The present invention generally relates to a threaded joint for pipes, in particular joints for pipes used in the gas or oil exploitation industry. These pipes can be used both as tubings for the pumping of gas or petroleum, and as casing of the drilling wells themselves.

STATE OF THE ART

In the natural gas and oil extraction industry, pipes of pre-defined length are used, which must be joined to each other at their ends to be able to reach the great depths where the hydrocarbon fields are usually located.

The drilling technique most commonly used is that of drilling, by means of boring, wells that start from land level or sea level until reaching the gas or oil reservoir. The depth of these wells can reach several thousand meters. During boring, the wells are lined with metal pipes along their whole length. The metal pipe segments, about ten meters long, are joined together by means of threaded joints. Therefore, these pipes form a tubular string, with a constant diameter along its whole length except in correspondence with the joint, where the outer diameter can be even 1 inch (25.4 mm) greater than that of the string itself.

To cover the whole depth of the well various strings are used, that for reasons of mechanical resistance and geological characteristics of the formation, have smaller diameters, the greater the depth reached by the string, in such a way as to form a "telescopic" type structure.

More and more frequently today the oil extraction industry is faced with the need to dig wells in extremely sloping positions with respect to the vertical position, or even in positions almost horizontal, to reach the oil or gas reservoirs. There are structural needs in the use of the pipes which cannot be satisfied by those pipes normally designed for vertical wells. In the case of horizontal or steeply sloping wells too, it is still necessarily to dig wells as much as possible to reduce costs.

Once drilling has been completed, within the well thus cased, another tubular string is introduced, which is used to pump the gas or oil towards the outside of the underground reservoir. This string, which is laid along the whole depth of the well and can therefore reach lengths of up to several thousand meters, is also formed by the joining of ten-meter pipes using joints of the same type as above. Usually, this second type of string also has a constant diameter along its whole length, except near to the joints where it generally has a larger external diameter, similarly to the previous case.

In both the cases above, the pipes are joined to each other by means of threaded pipe joints, that can be of an integral type, in which case one end of the pipe is male threaded and the other is female threaded, or by a sleeved joint, in which case both ends of the pipe are male threaded and are joined by a female threaded sleeve on both sides.

The selection between the various types of joint is made according to the load that the tubular string must bear, the pressure acting internally and/or externally, its length and the maximum diameter size possible, in relation to the diameter of the well.

If the diameter of the joints is reduced, it is necessary to find solutions to compensate for their lower structural resistance. In fact, in the joint area, the efficiency is necessarily lower than in the pipe main body because the construction elements, such as the threading, the seals and the shoulders are made in the thickness of the pipe wall, which causes a section reduction in critical areas of the male or female.

Reducing the causes of breakage of the joints to a minimum is vitally important, as the breakage of pipes, especially after being laid underground, therefore making it almost impossible for the operators to intervene directly on the joint that may have broken, can have serious economic consequences on the extraction plant and cause considerable environmental damage, especially in the event that the reservoir contains aggressive elements.

In the past, therefore, much work has been done to improve the pipe joints and to make them optimally efficient, trying to reach a correct balance between the various needs, which are sometimes in contrast to each other, of minimum size, maximum structural resistance and leakage and/or infiltration seal to liquids. The pipes are in fact subjected to compression, traction, flexure and torsion loads almost always in the presence of pressure produced by fluid agents from the outside and/or circulating inside the pipes themselves.

The joints must also have excellent make-up and seizure resistance properties.

The structural and sealing problems are often made worse by the temperature of the fluids, their corrosiveness or the existing environmental conditions in the mining area.

The current drilling methods allow a single plant to reach various depths and reservoir locations, with wells that are sloping, curved or even horizontal: this, if on the one hand represents a great economic advantage, also causes extremely high structural stress from compression and torsion on the pipes and on the joints, during the lowering operations of the string into the well, due to the friction forces that develop between the pipe itself and the well wall. The pipes' required resistance to compression, especially in the threaded joint area is therefore a much felt need, and often the weakness of the joints is a weak point of this type of technology. Similar unfavourable conditions also occur in the strings when they are used to inject steam, due to the high thermal loads. Proposals have therefore been made to improve the compression performance of these joints by using a threading of such a size that both flanks of the thread of a pipe segment come into contact with the flanks of the corresponding thread on the other pipe segment, once the joint has been made-up. The contact on both flanks of the thread is an important contribution for achieving a compression behaviour as similar as possible to the traction behaviour of the joint.

In particular circumstances, for example, for very sloping angles of the lead-in flank of the thread, measured compared to a perpendicular surface to the pipe's axis, the compression action of the string is unsatisfactory, as this type of solution aids the onset of the phenomenon defined as "jump-in", when the compression forces exceed certain limits. The jump-in consists in the sliding of the male pipe segment into the female segment, exceeding the resistance given by the threading of the two pieces and it occurs more frequently the more sloping the angle of thread lead-in.

Another drawback of this type of thread is that it is subject to high risk of seizure of the joint with the consequent risk of not ensuring the airtight seal of the fluids, upon bearing, a torque that varies greatly as the screwing operation of the joint proceeds and more turns are mutually involved. This introduces difficulties in making the joint and creates the possibility of imprecision in applying the correct driving torque.

Another solution that has been proposed to improve the resistance characteristics of the pipe joint envisages the increase of the thicknesses of both the male pipe segment and the female pipe segment, also to be able to obtain an annular shoulder of greater size in the female, near to the bearing area. This involves an increase in the processing of the ends of the pipes, which requires, in particular, before putting them through the threading process, a processing for permanent set, with the consequent stress-relieving treatment to eliminate residual stress, with a consequent increase of costs and time for production. This permanent set operation is necessary especially for thinner walled pipes, to improve resistance. However, also in this case, the results are not always satisfactory as in the best of cases the compression resistance obtained in this way at the joint point never exceeds 70% of the resistance of the non-threaded part of the pipe segment.

Therefore the need for a joint that has high resistance and seal performance even under high compression loads is felt, while maintaining its own airtight seal capacities. The joint must also be easy to centre and assemble, so that it can be assembled in the field, even using automatic boring equipment.

It is also suitable that the joint is feasible on pipes made from different materials that can be used for the construction of tubings for boring. Such materials comprise, for example, carbon, chromium or corrosion-resistant alloy steels, for example those containing high quantities of Cr, exceeding 9%, with the presence of Ni and Mo, such as the martensitic steels or duplex stainless steel or austenitic or Nickel iron alloys.

SUMMARY OF THE INVENTION

The problems posed above are solved by means of a threaded, either integral or sleeved, joint for pipes comprising a male member, which consists of a pipe provided with a threading on at least a part of its outer surface and a female member, consisting of a pipe or sleeve provided with threading on at least a part of its inner surface, in which the end of the male member has an annular shoulder and a corresponding annular supporting shoulder formed inside the female member, said threadings being adapted to screw reciprocally and reversibly until creating a contact between said annular supporting surfaces, said threadings having a section along a plane laying on the axis of the member on which the threading is made with a profile that has a load flank and a lead-in flank, said lead-in flank forming an angle varying from 10 to 25° with respect to a plane perpendicular to the axis of the member on which the threading is formed, said threadings being such that when the contact between said annular supporting surfaces has been made, when the joint is unloaded, a gap is provided located between the lead-in flank of the threading of the male member and the corresponding facing flank of the threading of the female member, measured along a direction parallel to the joint's axis, which coincides with the axes of the two said members, when they are mutually screwed, varying from 0.01 to 0.12 mm, and wherein the internal diameter D3 and the external diameter D4 of said male member, in the pipe portion not involved in the coupling with the female member, and the internal diameter D1 and the external diameter D2 of the bearing surface formed in the female member are linked by the relationship $(D2^2-D1^2)/(D4^2-D3^2) \geq 0.5$.

Preferably said annular bearing surfaces are frusto-conical surfaces and the one formed on the end of the male member is turned towards the axis of the member.

According to a further aspect of the invention, the mentioned problems are solved by pipes of a defined length, according to claims 8–20.

DETAILED DESCRIPTION OF A PREFERRED EMBODIMENT

With reference to the drawings, a joint according to the present invention is now described by way of non-limiting example.

Figure 1:
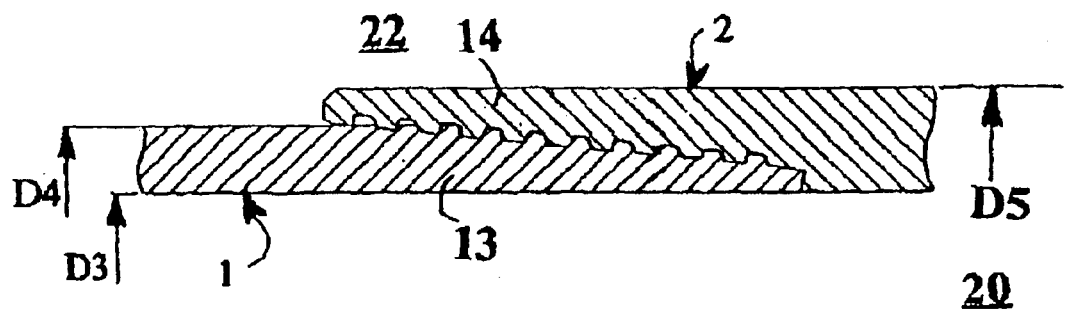
FIG. 1 is a side section view of a made-up joint according to the invention.
Figure 2:
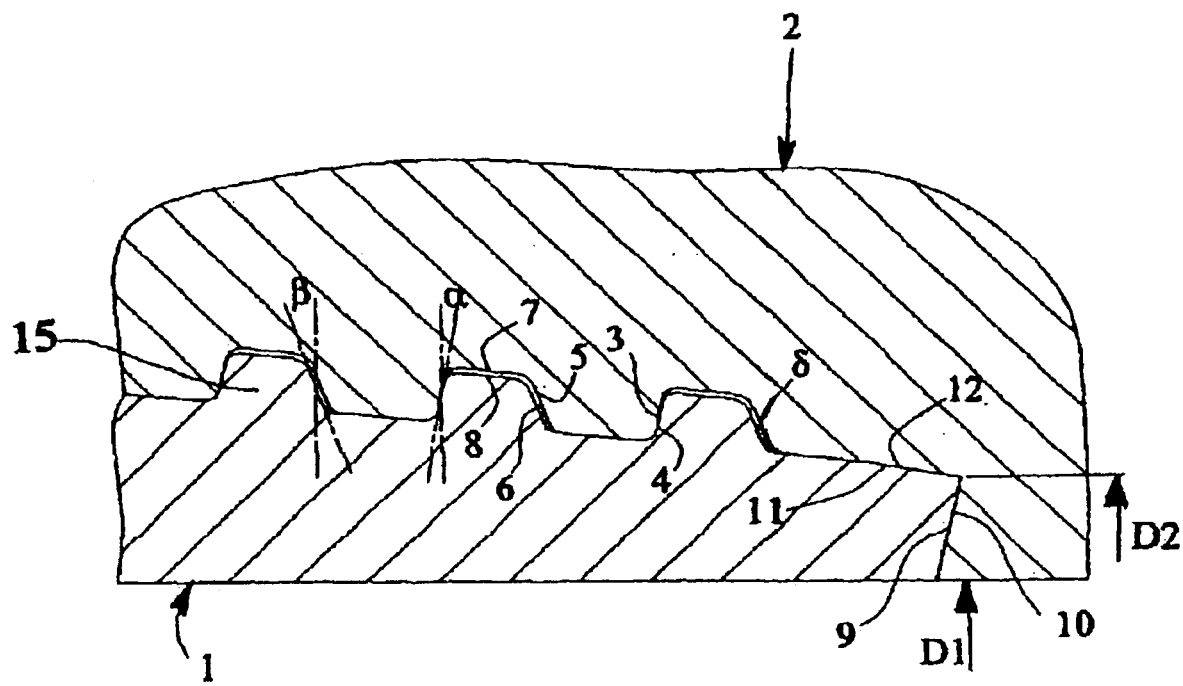
FIG. 2 is an enlarged view of part of FIG. 1, showing the extremity of the made-up male and female members.

The joint shown in the figures comprises two members, i.e. the male 1 and the female 2. In this case, the male member is a pipe, generally male threaded at both ends, and the female member is a sleeve female threaded at both ends and joins two pipes, by means of two joints as described. The joint defines an inner part 20, containing the axis 21 of the pipe segments 1 and 2, in which the fluid, for example natural gas or petroleum or other similar fluid, flows, and an outer part 22 in which there can be fluids of various kinds, which are also generally pressurised. The external diameter D4 of the pipes, in the area not involved in the joint between the male member and female member can be smaller than the external diameter D5 of the end of the female member in the joint area of a value that varies from 0% in the event of an integral "flush" type joint up to around 15% in the case of a sleeve joint. The male member 1 has an end 13, which has a threading on its outer surface. As can be seen in FIG. 2, the turns of the threading have a thread profile 15, on a plane laying on the axis of the member, substantially trapezoidal. In each tooth the thread has a lead-in flank 6, a load flank 4 and a crest 7.

The lead-in flank 6 forms an angle β with respect to a plane perpendicular to the axis 21 comprised between 10 and 25°. The angle of both the lead-in and the load flanks is defined positive, as in the case illustrated, if the surface of the flank is turned in the screw towards the opposite flank from the axis 21 of the joint, i.e. towards the outside and towards said axis in the internal thread.

The angle α of the load flank 4, i.e. the one formed compared to a plane perpendicular to the axis 21 can be positive or negative and preferably varies from −4 to 30.

The end 13 of the male member 1 comprises the sealing surface 11, for example of frusto-conical shape, and an annular shoulder 9 with a flat or frusto-conical surface, with an angle at the base of the cone with a value comprised between 0° and 20°. The end 13 can have the outer surface threaded advantageously as a truncated cone, as shown, with a taper that is preferably between 6 and 10%. The thread pitch preferably vary from 3 to 5 turns per inch. The thread can be perfect or have portions where it is imperfect. The part of the external surface of the end 13 comprising the sealing surface 11 is not threaded and is generally with a greater taper than the threaded part. The surface 11 can also be of a spherical shape in other alternative embodiments, but other shapes are also possible.

The end 14 of the female member 2 must be such that it screws onto the end 13 of the male member 1. The make-up is considered complete when the annular surface 10 formed in the female member 2 at the end of the threaded end 14, comes into contact with the corresponding surface 9. There can be provided a surface with a sharp taper 12, corresponding to 11, against which it comes into contact after make-up. The surfaces 11 and 12 form an airtight metal-metal seal. Preferably the lead-in and the load flanks 5 and 6 of the threading of the female member will be the same as those of the male member, considering the signs as shown above.

The thread of the end 14 corresponds to the thread of the end 13 of the male member 1. It is such that, after make-up, the load flank 3 is obviously touching the load flank 4 of the male. Between the lead-in flank 6 and the flank 5 of the male, with an unloaded joint, i.e. with no axial or bending loads on the members 1 and 2, there is a gap, measured along a direction parallel with the axis of the joint varying from 0.01 and 0.12 mm. Between the crest 8 of the thread of one member and the root 7 of the other member, in the zone between two turns the gap is comprised between 0.05 and 0.30 mm.

The internal diameter D3 and the external diameter D4, in the portion of said male member 1 not involved in the coupling with the female member, the internal diameter D1 and external D2 of the supporting surface 10 formed in the female member 2, are linked by the following relation $(D2^2-D1^2)/(D4^2-D3^2) \geq 0.5$.

The joint of the invention is suited to bearing high axial compression forces on the pipe, forces that bring the lead-in flanks 5 and 6 into contact, that thus begin to bear the compression load parallel to the supporting surfaces 9 and 10, while the area near to said surfaces 9 and 10 is still in elastic deformation condition.

Furthermore, it has satisfactory resistance to wear and seizure. The female member can be a sleeve connecting two pipe-shaped male members, as in the case described. Alternatively, there can be an integral joint, where the two members are two lengths of pipe, one male threaded and one female threaded on the ends forming the joint. In this case, the male threaded member on one end can be female threaded (and vice versa) on the other end, to form another integral joint with another length of pipe. In such a case each pipe, near to the female threaded length, may have an enlargement of its external diameter to provide suitable resistance, for example, near-flush joints. The internal diameter of the pipes may be preferably equal to provide continuity in the pipe line. In the case of sleeved joints, also the internal diameter of the pipe coupling, in the area not involved in the coupling with the male member, will preferably be equal to that of the pipe, as can be seen in the drawings; said diameter coincides with the internal diameter D1 of the supporting surface 10.

We claim:

1. A threaded joint for pipes defining an axis (21), comprising a coaxial male member (1) consisting of a pipe provided with a threading on a portion of its outer surface in proximity of at least one of its ends (13) and a female coaxial member (2), consisting of a pipe or sleeve provided with threading on a portion of its inner surface in proximity of at least one of its ends (14), wherein the male member (1) is provided with a cylindrical portion, intermediate between its ends having walls of a constant thickness and wherein the male member is provided at said at least one of its ends (14) with an annular abutment surface (9) and wherein a corresponding annular abutment surface (10) is formed on the inside of the female member (2), said threadings being adapted to screw on reciprocally and reversibly to produce a contact between said annular abutment surfaces (9, 10), said threadings being complementary and wherein the thread profile, in a section along a plane containing the axis (21), defines a load flank (4, 3) forming a first angle (α) with respect to a plane perpendicular to the axis (21) and defines a lead-in flank (6, 5) forming a second angle (β) with respect to a plane perpendicular to the axis (21), characterized in that said second angle (β) has a value between 10 and 25°, and in that when the joint is assembled and the contact between said annular abutment surfaces (9, 10) is achieved, in absence of axial loads, there is provided, between the lead-in flank (6) of the threading formed on the male member and that (5) of the thread made on the female member, a gap of a size between 0.01 and 0.12 mm, measured along a direction parallel to the axis (21) of the joint, and in that the internal diameter (D3) and external diameter (D4) of the cylindrical length of said male member (1), the internal diameter (D1) and external diameter (D2) of the abutment surface of the female member being linked in the relationship $(D2^2-D1^2)/(D4^2-D3^2) \geq 0.5$.

2. The pipe joint according to claim 1, wherein the load flanks (4, 3) form an angle (α) with respect to a plane perpendicular to the axis (21) of the joint comprised between −4 and 3°.

3. The joint according to claim 2, wherein the portions with a threading have a taper of a value between 6 and 15%.

4. The joint according to claim 3 in which a gap of a value between 0.05 mm and 0.30 mm is provided between the crests (8) of the male member and the roots (7) of the female member, and the roots of the male member and the crests of the female member (2) are in contact, upon make-up.

5. The pipe joint according to claim 4, wherein the thread has from 3 to 5 turns per inch.

6. The pipe joint according to claim 5, wherein the annular abutment surfaces (9, 10) are complementary and of frusto-conical shape, the abutment surface (9) of the male member (1) having an angle at the base of a value between 0 and 20° and an apex directed towards the inside of the male member.

7. The connection according to claim 1, wherein said female member (2) is a sleeve with a female threading on both ends.

8. A pipe of defined length wherein at least one extremity has an externally threaded portion adapted to form a male member (1) of a joint according to claim 1.

9. A pipe of defined length wherein at least one extremity has an externally threaded portion adapted to form a male member (1) of a joint according to claim 2.

10. A pipe of defined length wherein at least one extremity has an externally threaded portion adapted to form a male member (1) of a joint according to claim 3.

11. A pipe of defined length wherein at least one extremity has an externally threaded portion adapted to form a male member (1) of a joint according to claim 4.

12. A pipe of defined length wherein at least one extremity has an externally threaded portion adapted to form a male member (1) of a joint according to claim 5.

13. A pipe of defined length wherein at least one extremity has an externally threaded portion adapted to form a male member (1) of a joint according to claim 6.

14. A pipe of defined length wherein at least one extremity has an externally threaded portion adapted to form a male member (1) of a joint according to claim 7.

15. A pipe of defined length wherein at least one extremity has an internally threaded portion adapted to form a female member (2) of a joint according to claim 1.

16. A pipe of defined length wherein at least one extremity has an internally threaded portion adapted to form a female member (2) of a joint according to claim 2.

17. A pipe of defined length wherein at least one extremity has an internally threaded portion adapted to form a female member (2) of a joint according to claim 3.

18. A pipe of defined length wherein at least one extremity has an externally threaded portion adapted to form a female member (2) of a joint according to claim 4.

19. A pipe of defined length wherein at least one extremity has an externally threaded portion adapted to form a female member (2) of a joint according to claim 6.

20. A pipe of defined length wherein at least one extremity has an externally threaded portion adapted to form a female member (2) of a joint according to claim 7.

* * * * *